R. P. MATHEWS.
GRAVITY CARRIER.
APPLICATION FILED OCT. 17, 1906.
978,466.
Patented Dec. 13, 1910.
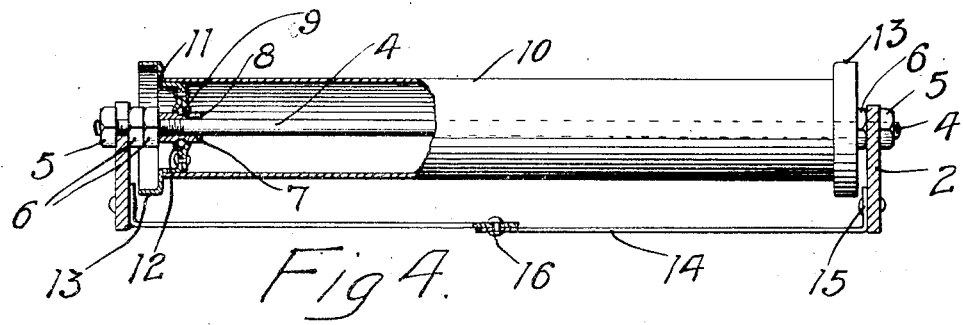
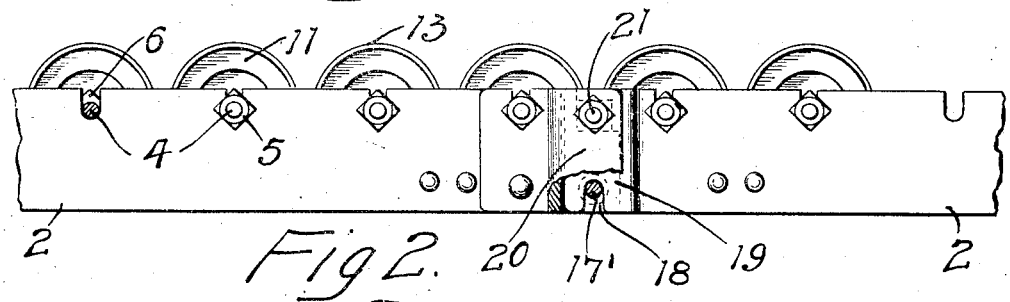
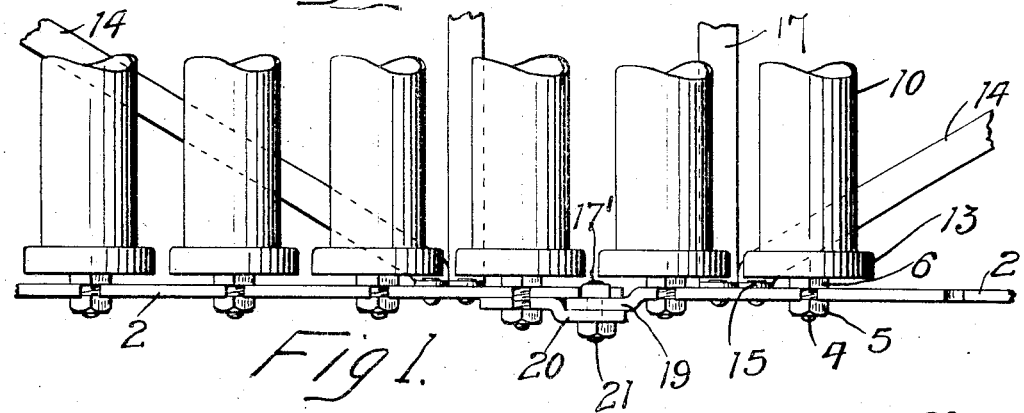
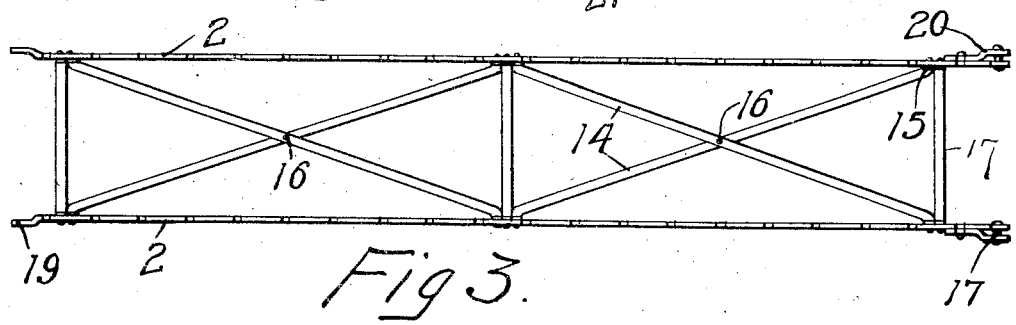
WITNESSES
INVENTOR
RUFUS A. MATHEWS
BY
HIS ATTORNEYS

UNITED STATES PATENT OFFICE.

RUFUS P. MATHEWS, OF ST. PAUL, MINNESOTA, ASSIGNOR TO MATHEWS GRAVITY CARRIER CO., OF ST. PAUL, MINNESOTA.

GRAVITY-CARRIER.

978,466.   Specification of Letters Patent.   Patented Dec. 13, 1910.

Application filed October 17, 1906. Serial No. 339,379.

*To all whom it may concern:*

Be it known that I, RUFUS P. MATHEWS, of St. Paul, Ramsey county, Minnesota, have invented certain new and useful Improvements in Gravity-Carriers, of which the following is a specification.

The object of my invention is to provide a carrier adapted particularly for transporting by gravity small articles such as brick, the rollers being utilized for the carrier surface, and anti-friction bearings being provided therefor, so that the articles will move in the direction of the least resistance or lengthwise of the carrier.

The invention consists generally in a carrier having side rails provided with slots or notches in their upper edges and rollers detachably mounted in said notches whereby any roller can be removed from the carrier without disturbing the other rollers.

Further, the invention consists in various constructions and combinations, all as hereinafter described and particularly pointed out in the claims.

In the accompanying drawings, forming part of this specification, Figure 1 is a plan view of one side of a carrier showing the manner of coupling the sections together. Fig. 2 is an edge or side view of the same. Fig. 3 is a plan view of the carrier with the rollers removed. Fig. 4 is a transverse sectional view illustrating the manner of mounting the rollers on their supports.

In the drawing, 2 represents the side rails of the carrier, composed preferably of flat steel bars. These bars are provided at intervals in their upper edges with vertical slots or notches 3 adapted to receive rods 4 having threaded ends and provided with lock nuts 5 and 6, the former on the outside of the bars and the latter between them. Hubs 7 are fitted on the threaded ends of the rods and held in place by the lock nuts 6 and provided with annular grooves 8 forming ways for bearing balls 9. The rollers are composed preferably of cylindrical sections of steel tubing 10 having open ends to receive heads 11 fitting snugly therein, said heads having central holes to receive the hubs 7 and annular ways 12 between which and the grooves in said hubs, the bearing balls are held. Flanges 13 are provided at the peripheries of the heads forming bearing surfaces for articles passing over the carrier of greater length than the rollers. The rollers are held securely in place on the rods 4 by the lock nuts 6 bearing on the outer ends of the hubs. Any roller can be easily removed from the carrier by loosening the lock nuts 5. The rollers are placed sufficiently near together so that small articles cannot drop down between them. The sides of the carrier are held in parallel relation with one another by means of braces 14 consisting preferably of flat metal bars having upwardly turned ends 15 riveted to the side bars of the carrier, and secured together at their points of intersection by rivets 16. Cross bars 17 may also be provided, secured in a similar manner to the side rails.

Various forms of coupling devices may be provided for uniting the ends of the sections, but I prefer to provide a tongue 19 on the end of each rail 2 bent outwardly to offset it from the plane of the rail and adapted to fit between a plate 20 and the end of the abutting rail. The plate 20 is preferably offset and mounted on one of the roller rods 4, and a rivet 17' connects the plate and its rail and is adapted to enter a seat 18 in the lower edge of the tongue 19. The plate 20 and tongue 19 may be further secured together by a bolt 21 which however is often omitted, the slot 18 and rivet 17' connection being sufficient to hold the sections in their proper relative positions.

I claim as my invention:—

1. A gravity carrier having side rails composed of flat metal bars having slots or notches in their upper edges, rods detachably mounted in said slots and connecting said rails, and rollers having anti-friction bearings on said rods, substantially as described.

2. A gravity carrier comprising side rails having slots or notches in their upper edges at intervals, and idle rollers extending across the carrier from side to side detachably mounted in said notches.

3. A gravity carrier comprising side rails and braces connecting them at intervals, said rails having vertical slots or notches in their upper edges and idle rollers mounted in said slots and extending across the carrier from side to side, each roller being removable without disturbing the other rollers.

4. A gravity carrier comprising side rails, diagonally arranged brace bars connecting said rails, cross rods also connecting said rails, the upper edges of said rails being provided with vertical slots or notches and rollers detachably mounted in said notches.

5. A gravity carrier comprising side rails and rods connecting them at intervals, said rods having threaded ends and hubs fitting thereon, lock nuts engaging said hubs and rollers having anti-friction bearings on said hubs, substantially as described.

6. A gravity carrier comprising side rails and rods connecting them at intervals and having lock nuts, rollers composed of cylindrical sections of steel tubing having open ends and heads fitting within said ends, hubs mounted on said rods and held by said nuts, and ball bearings interposed between said hubs and said heads, substantially as described.

7. A gravity carrier composed of sections having side rails, the ends of the rails of one section being offset to form tongues having notches in their lower edges, plates secured to the ends of the contiguous section and offset therefrom, rivets connecting said plates and the ends of the rails and adapted to enter the slots in said tongues and hold the sections in alinement with one another, substantially as described.

8. A gravity carrier comprising side rails having slots in their upper edges at intervals and braces connecting said rails and holding them in parallel relation, rods having threaded ends fitting within said slots and provided with lock nuts on said ends on the outside of said rails and between them, hubs provided on the ends of said rods and rollers having anti-friction bearings on said hubs.

9. A gravity carrier comprising side rails, rods having their ends mounted on said rails and anti-friction idle rollers journaled on said rods between said rails and extending across the carrier from side to side and disposed sufficiently near to one another to form a substantially continuous carrying surface, said rods being removable from said rails without separation from said idle rollers, whereby any roller with its rod may be removed from the carrier without disturbing the other rollers and rods.

10. A gravity carrier comprising metallic side rails, having notched upper edges, rods detachably mounted in said notches and idle rollers composed of tubing journaled on said rods between said rails.

In witness whereof, I have hereunto set my hand this 4th day of October, 1906.

RUFUS P. MATHEWS.

Witnesses:
RICHARD PAUL,
J. B. EVA